(12) United States Patent
Wallace

(10) Patent No.: US 8,818,926 B2
(45) Date of Patent: Aug. 26, 2014

(54) METHOD FOR PERSONALIZING CHAT BOTS

(76) Inventor: Richard Scot Wallace, Stockton, CA (US)

( * ) Notice: Subject to any disclaimer, the term of this patent is extended or adjusted under 35 U.S.C. 154(b) by 913 days.

(21) Appl. No.: 12/586,851

(22) Filed: Sep. 29, 2009

(65) Prior Publication Data

US 2011/0078105 A1   Mar. 31, 2011

(51) Int. Cl.
- *G06N 5/04* (2006.01)
- *G06F 17/30* (2006.01)
- *G06Q 10/10* (2012.01)
- *G06Q 30/02* (2012.01)
- *G06N 3/00* (2006.01)

(52) U.S. Cl.
CPC .............. *G06N 5/047* (2013.01); *G06N 3/004* (2013.01); *G06N 3/006* (2013.01); *G06N 3/008* (2013.01); *G06F 17/30654* (2013.01); *G06Q 10/107* (2013.01); *G06Q 30/02* (2013.01)
USPC .............................................. 706/47; 706/45

(58) Field of Classification Search
USPC ....................................... 706/47, 45
See application file for complete search history.

(56) References Cited

PUBLICATIONS

Wallace, The Elements of AIML Style, Alice A. I. Foundation, Inc., 2003, pp. 1-86.*

* cited by examiner

*Primary Examiner* — Wilbert L Starks
(74) *Attorney, Agent, or Firm* — Roger Schlafly

(57) ABSTRACT

A system and method for automatically building chat bot content from scripts of conversations. A script is parsed into query-response pairs, so that a computerized device may be programmed to give the same responses when given similar queries. Each query is converted into canonical form and then matched against patterns, as in prior art chat bots. The response is then linked to the matched pattern. A new chat bot is constructed out of the canonical form conversions and the set of pattern-response links. The chat bot is further improved by adding interactive human conversations, provided that those conversations are rated highly. The resulting chat bot can run on a computer server that responds to public queries, and the server can also display context-sensitive advertisements.

16 Claims, 5 Drawing Sheets

METHOD FOR PERSONALIZING CHAT BOTS

BACKGROUND

This invention relates to computerized simulation of natural language conversations.

A chat bot (or robot) is a computer server or other computerized device that can carry on a conversation with a human. A famous early example was Joseph Weizenbaum's 1966 program called ELIZA. A (human) user could type in English language statements to the program, and ELIZA would simulate a Rogerian psychotherapist in its responses.

More advanced chat bots have competed to try to pass the Turing Test for artificial intelligence. The idea is to create a chat bot that simulate human conversation so well that a human is not sure whether he is talking to a computer or another human.

A popular language for creating chat bots is the Artificial Intelligence Markup Language (AIML). AIML is an XML dialect for creating natural language software agents. With AIML, one can program a computer to give a specified set of answers to a specified set of questions. More generally, it can recognize patterns in the user statements and questions, and then give appropriate responses. It can also recognize topics of conversation, and respond with something related to the current topic. AIML is an open standard, and there are many AIML implementations and chat bots. AIML is described in U.S. Pat. Nos. 7,305,372, 7,337,157, and 7,505,892.

The basic unit of knowledge in AIML is known, for historical reasons, as a "category". A category is a rule in the sense of a production system. The AIML category or rule consists of at least two components, an input-side pattern and an output-side template. When natural language input matches the input pattern, AIML activates the output template. In the simplest form the output template consists of a natural language response. The term "template" is used because in addition to the natural language reply, the response may optionally contain additional AIML code, some of which may optionally activate other patterns in other categories by recursion. The recursive feature of AIML is sometimes called "symbolic reduction" and is abbreviated as "srai" (symbolic reduction artificial intelligence).

The person who creates or trains a chat bot is called the botmaster.

A good AIML chat bot might be 50,000 lines of code, and requires many man-months to write from scratch. One AIML chat bot might be adapted from another, but a lot of (human) work is usually required to add significant content or to make any significant changes to the bot's personality.

There is also a need for chat bot creation methods that are not so labor intensive.

BRIEF SUMMARY OF THE INVENTION

The foregoing needs, and other needs and objects, are fulfilled by the present invention, which comprises, in one aspect, a method of This invention provides ways of combining an AIML chat bot with new conversational content to make new chat bots. A typical AIML chat bot receives a query or statement, does some pattern matching, and outputs a response. The pattern matching process has two major steps. The first step attempts to apply certain reductions (called "srai" reductions in AIML) in order to put the query into a canonical form. These reductions are applied repeatedly if necessary. The second step compares the canonical form to a database to find a match and an associated response.

Both search steps are commonly made efficient by using tree-based data structures and hash tables. AIML implementations with these efficiencies are available in the prior art. The patterns are also allowed to have wild cards, giving the chat bot greater generality in the queries that it can process.

This invention takes an AIML chat bot and uses conversational scripts to replace or augment its responses.

As an example, suppose someone has laboriously created an AIML chat bot that reflects his own conversational patterns, and he wishes to create a new chat bot that mimics Captain Kirk, a character in the old TV show Star Trek. He strips out his own responses from the AIML, and divides the remaining AIML into reductions and patterns. He gets text scripts for all the old TV show episodes, and parses them into query-response pairs for Kirk. He then processes those pairs. For each pair, he applies the reductions and then matches against the patterns, as if the AIML were looking for a response. But instead, the response is taken from the pair, and coupled to the matched pattern in the AIML.

In this example, the resulting chat bot would show the speech and personality of Captain Kirk, but the AIML code would require some manual fine tuning in order to become a convincing chat bot.

DETAILED DESCRIPTION OF THE INVENTION

The scripts for importing into an AIML chat bot may be obtained from a variety of sources. Movie and TV transcripts may be used to help create chat bots that simulate movie and TV characters. Scripts may be written directly for the purpose of creating AIML content. The advantage is that any writer who is familiar with the character can write a script, and he does not need to know the intricacies of AIML. He can just write the script, and use this invention to convert the script to AIML.

The scripts can also be generated as the logs to active chat sessions between humans. Preferably, one of the humans will be simulating the character that the chat bot is intended to emulate. The conversation could be spoken, in which case the voices would be recorded and automatic speech recognition converts the speech into text scripts that can be imported.

The scripts can also come from a game that can be run on a web site. The web site offers an opportunity for users to chat with other users, with some users simulating well-known personalities such as Captain Kirk. The user who chats with a Captain Kirk simulator can give a rating from one to five on how good the simulation is. The simulating users compete to score the highest ratings. The chat conversations with high ratings are saved, and imported into the chat bot.

In addition to the basic category containing a pattern and template, AIML categories may be associated with a "topic" and a "that"—and each of these are called contexts. An extension to AIML supports an arbitrary number of context levels.

In the general case, each path of the AIML graph contains an ordered list of contexts, including the input pattern, "that" context, the "topic" context, and any number of other botmaster-defined contexts. For example, gender and location might be contexts. In this general case the pattern graph no longer has blank responses, but must now also contain the original bot templates, so that the topic and other contexts can be set by AIML in the original templates. The pattern graph also has fully populated pattern paths. If no "that" context or "topic" context or other context is specified, the corresponding segment of the pattern path consists of a wildcard by itself, meaning the pattern path matches in any context.

Must Keep Template for Topics

Figure 1:
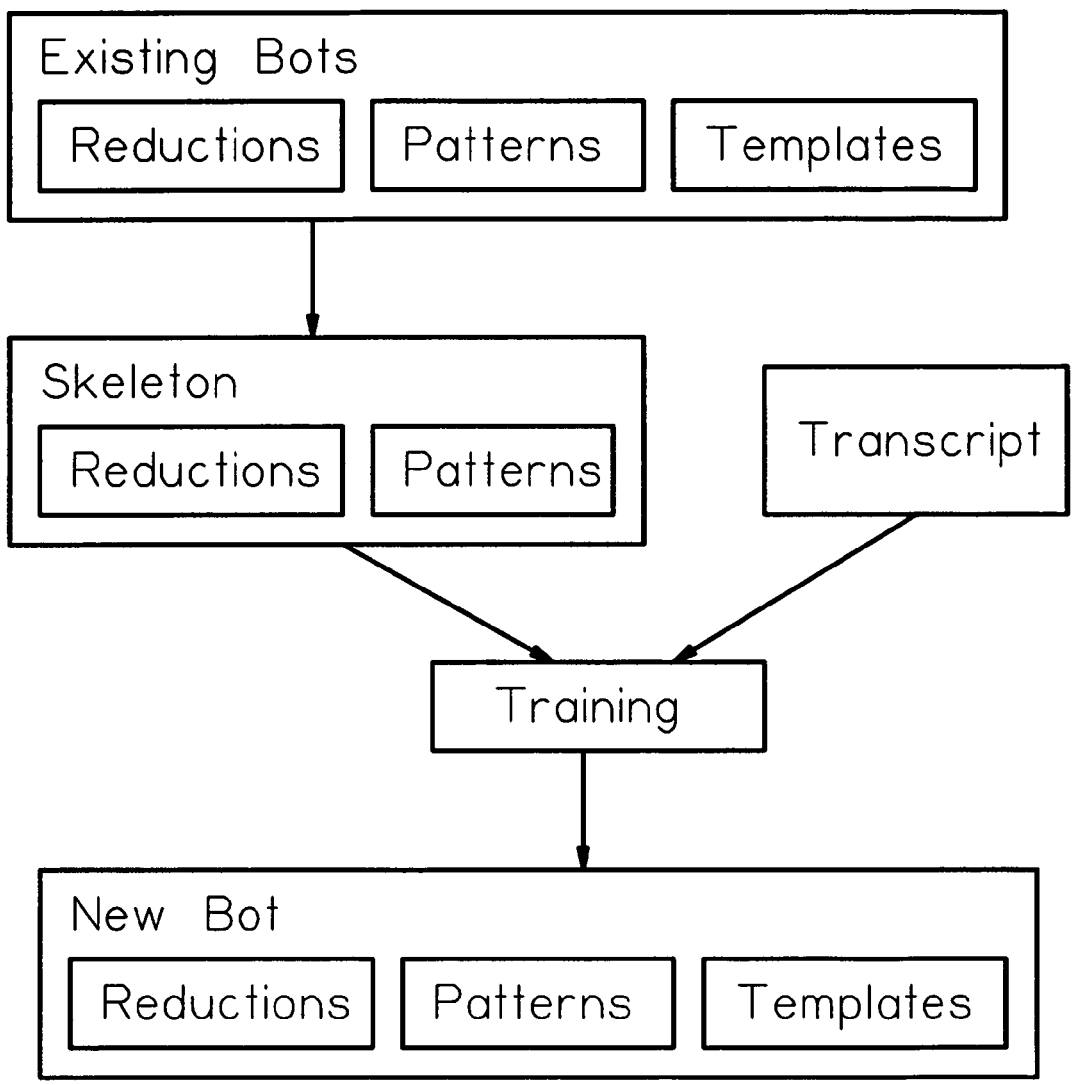
FIG. 1 shows how a bot can be stripped and trained to make a new bot.

FIG. 1 shows an overall view of the invention. A set of AIML Reductions, Patterns, and Templates is assembled from Existing Bots, and is stripped down to a AIML Skeleton for creating new bots. The Skeleton has the AIML Reductions for canonicalizing an input sentence, and the AIML patterns for matching against the canonicalized input. The responses are discarded from the Templates of the Existing Bots.

A Transcript has a new set of input/response sentences to be used in Training the New Bot. The inputs from the transcripts are canonicalized with the Reduction, and matched against the Patterns to find a matching pattern. An AIML Template is then created by associating the response sentence to the matching pattern. The Reductions, matched patterns, and Templates together are put together to form an AIML New Bot.

Figure 2:
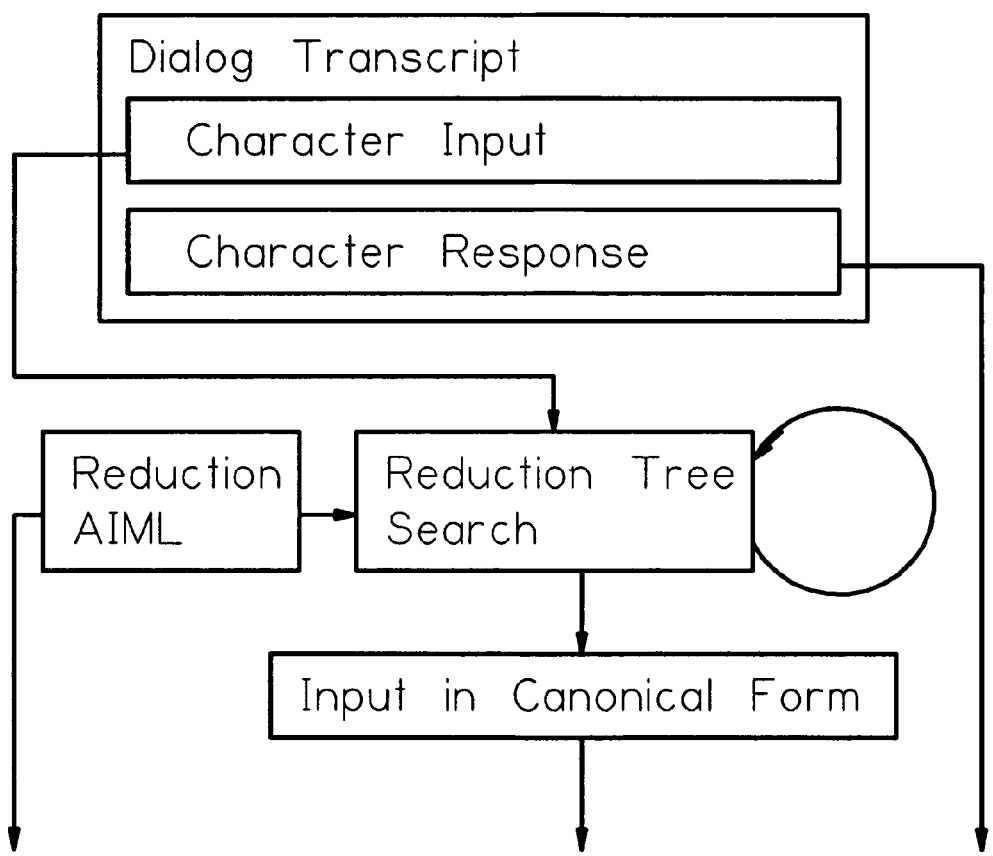
FIG. 2 shows importing a script input/response to an AIML chat bot.
Figure 3:
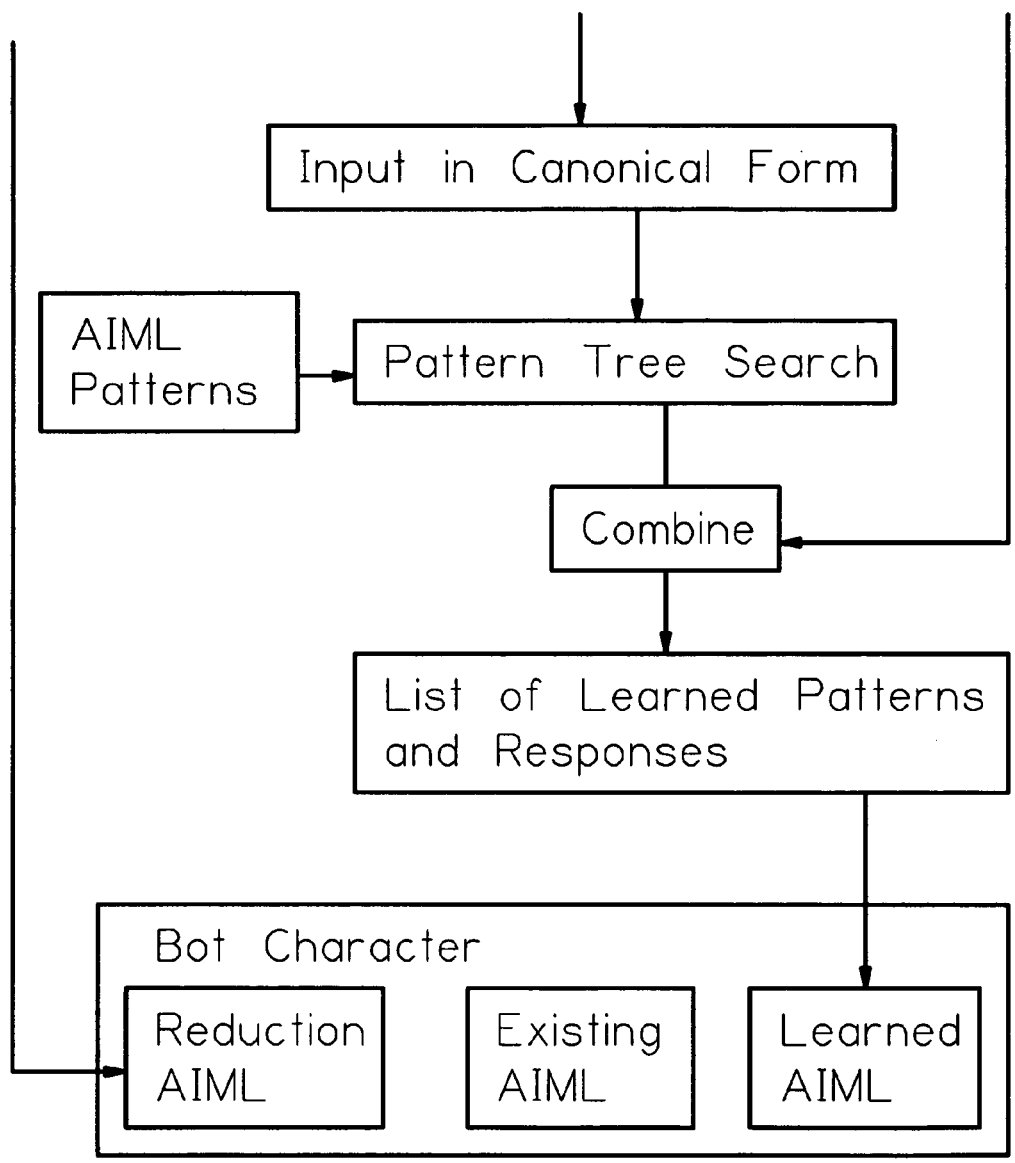
FIG. 3 shows a continuation of FIG. 2.

FIGS. 2 and 3 show in greater detail how a particular sentence pair is imported into a new bot that is being created. The Dialog Transcript is parsed into a sequence of input/response pairs. For each Character Input, the method applies the Reduction AIML, to do a Reduction Tree Search. A match causes the input sentence to be replaced by another sentence. The search is repeated until no more reductions are possible, and the result is an Input in Canonical Form.

FIG. 3 shows the AIML Patterns being used to apply a Pattern Tree Search to the Input in Canonical Form until a match is found. Because of the use of wild cards, some match is always found. When a match is found, a Combine step links it to the Character Response (from FIG. 2), and the combination is added to the List of Learned Patterns and Responses. This list is converted to AIML, and becomes the Learned AIML. The Learned AIML is added to the Existing AIML and the Reduction AIML in the Bot Character being created.

A new bot can be created by repeatedly applying the method shown in FIG. 2-3. Starting with just Reduction AIML and an empty Existing AIML, a transcript can be imported, one input/response sentence pair at a time. In each step, some Learned AIML is added.

Figure 4:
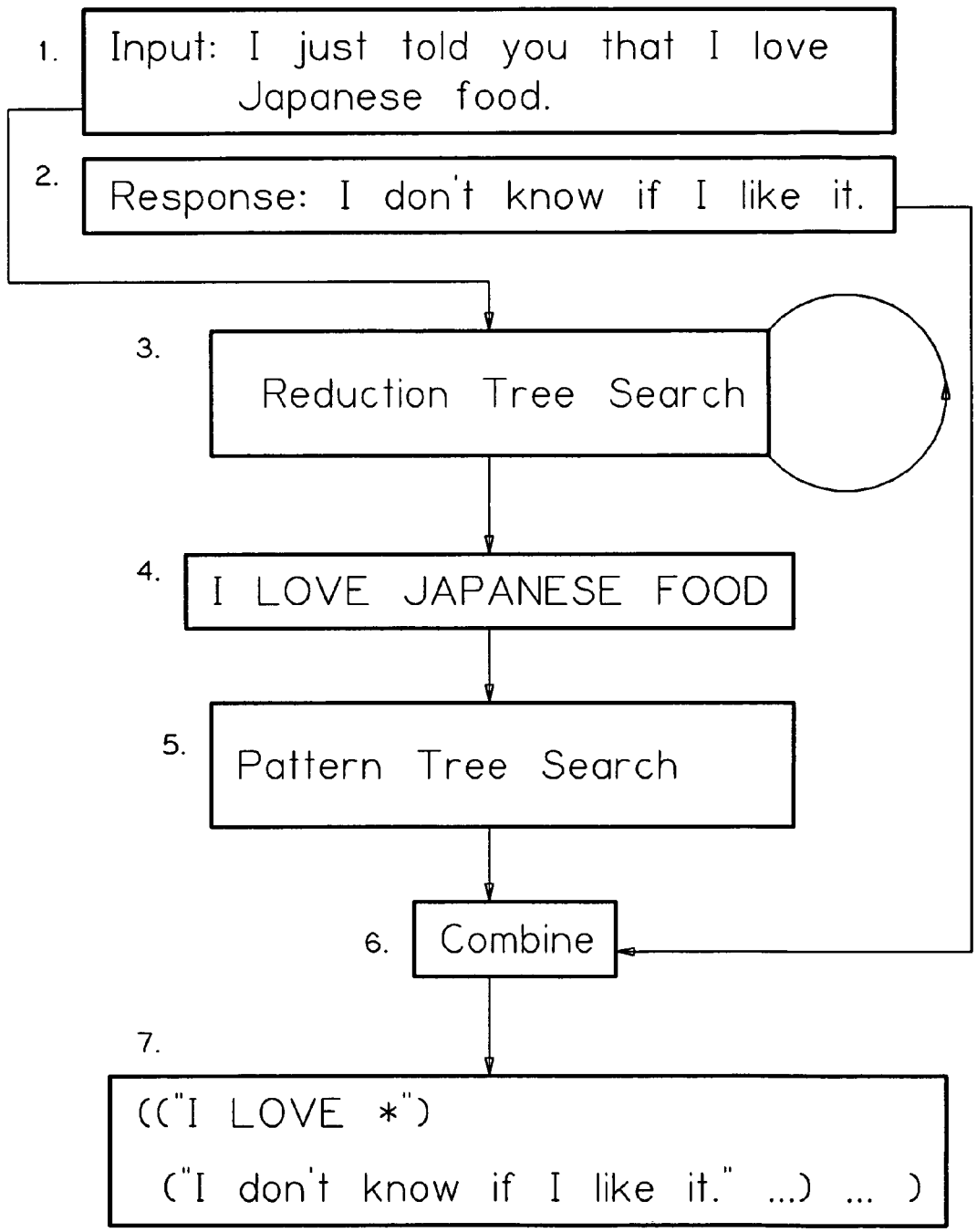
FIG. 4 shows how a particular input/response might be processed.

FIG. 4 shows an example of the method applied to particular sentences. The Input is "I just told you that I love Japanese food." The Reduction Tree Search uses a known set of AIML for eliminating extraneous words so that finding an appropriate response can be simplified. In this case, the words "I just told you that" get removed, leaving "I LOVE JAPANESE FOOD". In this implementation, punctuation is removed and letters are converted to upper case.

A Pattern Tree Search is applied to "I LOVE JAPANESE FOOD". In this case, an exact text match is not found, and a match against the wild card pattern "I LOVE *" is found. This pattern is then used with the Response in a Combine step 6 to produce some AIML in step 7. That combined AIML can then be added to an AIML bot.

Figure 5:
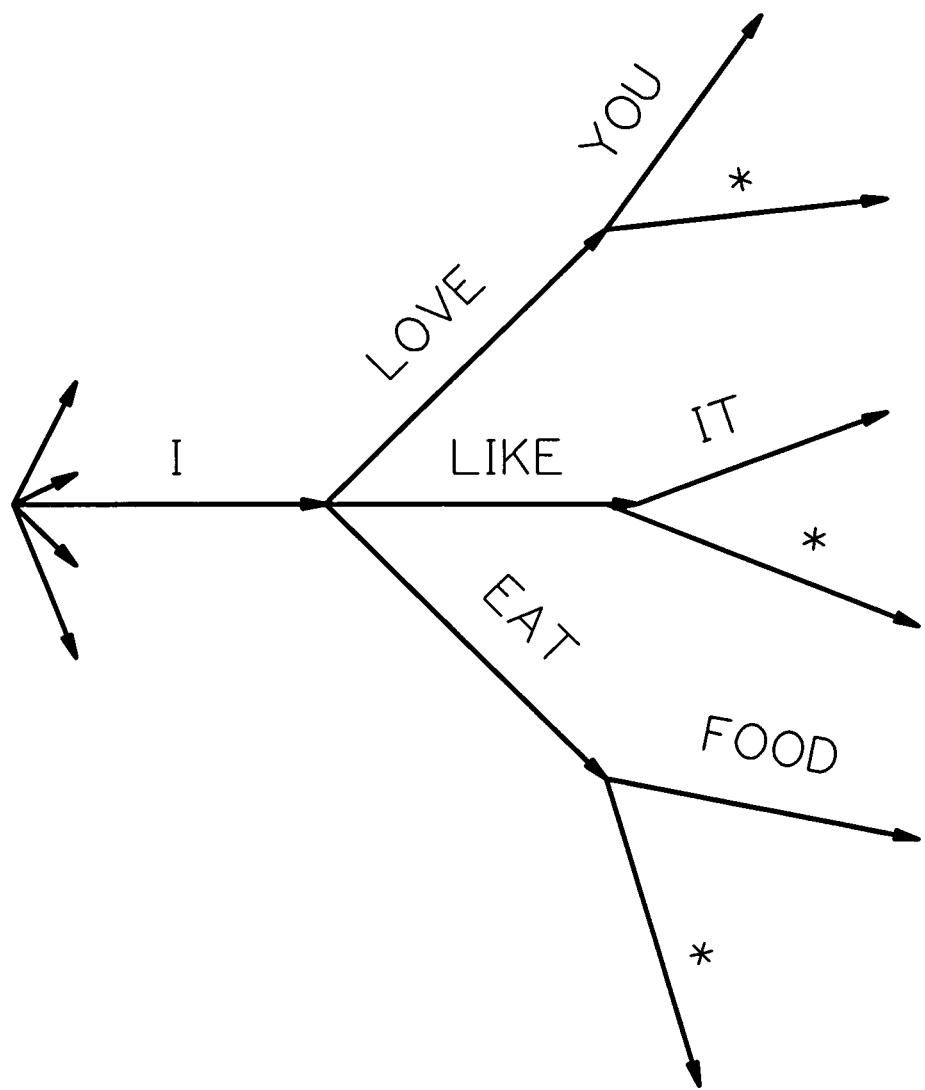
FIG. 5 shows a tree data structure for storing a pattern.

FIG. 5 shows a fragment of a tree structure for patterns. This tree structures allows many thousands of patterns to be searched very quickly. When trying to match "I LOVE JAPA-NESE FOOD", the first word "I" is matched using a hash table. The second word "LIKE" is compared to "LOVE", not getting a match, and then "LIKE" for a match. It is not compared to "EAT" because a match has already been found. Then the third word "JAPANESE" is compared against "IT", not matching. It matches the wild card "*" because everything matches the wild card.

The method can also create bots with AIML for contexts, such as "topic" and "that", if the AIML for those contexts is already is the skeleton AIML. In that case, the skeleton AIML will contain templates for use with pattern matches, but the actual response text will be ignored. When training a new bot, and input matches a pattern, the corresponding template for context processing is retained, with the new response replacing the old response. The resulting AIML is then used to construct a bot that is able to give responses that, depending on the context, may depend on the previous response or the topic or some other context variable.

While the invention has been described in terms of preferred embodiments, those skilled in the art will recognize that the invention can be practiced with modification within the spirit and scope of the appended claims.

I claim:

1. A computerized method for personalizing a chat bot, comprising the steps:
   loading a query sentence and a response sentence;
   applying a set of reduction rules to said query sentence to get a canonicalized query sentence;
   matching said canonicalized query sentence against a set of patterns to get a matching pattern;
   combining said matching pattern with said response sentence into a pair; and adding said pair into said chat bot;
   wherein said query sentence for said chat bot is from a first user, and said response sentence is from a second user who is simulating a particular personality.

2. The method of claim 1, further comprising: recording a rating from said first user or said second user, and using said rating to screen updates to screen updates to said chat bot.

3. The method of claim 1, further comprising updating said chat bot in real time.

4. The method of claim 1, further comprising serving context-sensitive ads in real time.

5. A digital computer system programmed to perform the method of claim 1.

6. A non-transitory computer-readable medium storing a computer program implementing the method of claim 1.

7. A non-transitory computer-readable medium storing a computer program implementing the method of claim 1.

8. A computerized method for personalizing a chat bot, comprising the steps in sequence:
   loading a query sentence and a response sentence from a transcript;
   applying a set of reduction rules to said query sentence to get a canonicalized query sentence;
   matching said canonicalized query sentence against a set of patterns to get a matching pattern;
   combining said matching pattern with said response sentence into a pair;
   adding said pair into said chat bot;
   representing said set of reduction rules as a reduction tree with hashed branches for efficient depth-first searching; and
   representing said a set of patterns as a pattern tree with hashed branches for efficient depth-first searching.

9. The method of claim 8, further comprising:
   associating context-inference rules to said set of patterns; and adding to said pair a template with any of said context-inference rules associated to said matching pattern.

10. A computerized method for creating chat bot content, comprising the steps:
- getting a reduction matcher and a pattern matcher from another AIML chat bot;
- parsing a conversation script into query-response pairs with a query sentence and a response sentence;
- for each of the query-response pairs, using said reduction matcher to canonicalize said query sentence, and using said pattern matcher to find a pattern that matches the canonicalized query response;
- building an AIML list of the patterns coupled with the response sentences; and creating a new chat bot by combining said AIML list with said reduction matcher.

11. The method of claim 10, further comprising:
representing said reduction matcher as a reduction tree with hashed branches for efficient depth-first searching; and
representing said pattern matcher as a pattern tree with hashed branches for efficient depth-first searching.

12. The method of claim 10, further comprising:
associating topic-inference rules to said pattern matcher; and
altering a current topic if indicated by a rule associated with said matching pattern.

13. The method of claim 10, wherein said response sentences are from a user who is simulating a particular personality.

14. The method of claim 10, further comprising updating said chat bot in real time.

15. The method of claim 10, further comprising serving context-sensitive ads in real time.

16. A digital computer system programmed to perform the method of claim 10.

* * * * *